Figure 1:
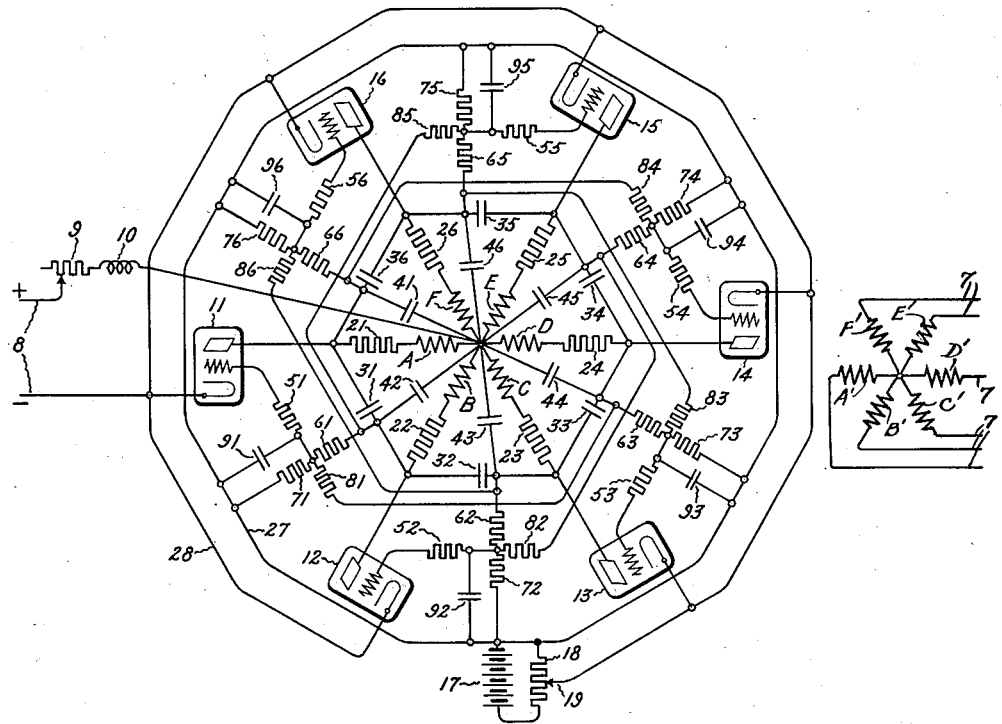

Oct. 15, 1935.                B. D. BEDFORD                2,017,708
                            POLYPHASE OSCILLATOR
                    Filed Nov. 28, 1930          2 Sheets-Sheet 1

Inventor:
Burnice D. Bedford,
by Charles E. Mullen
His Attorney.

Oct. 15, 1935.   B. D. BEDFORD   2,017,708
POLYPHASE OSCILLATOR
Filed Nov. 28, 1930   2 Sheets-Sheet 2

Inventor:
Burnice D. Bedford,
by Charles E. Tullar
His Attorney.

Patented Oct. 15, 1935

2,017,708

UNITED STATES PATENT OFFICE 2,017,708

POLYPHASE OSCILLATOR

Burnice D. Bedford, Schenectady, N. Y., assignor to General Electric Company, a corporation of New York Application November 28, 1930, Serial No. 498,773

21 Claims. (Cl. 175—363)

My invention relates to electric circuits for generating polyphase periodic current and more particularly to such circuits utilizing electric valves which are capable of producing periodic current of any desired number of phases.

Heretofore various arrangements have been proposed for converting direct current into polyphase alternating current by the use of electric valves of high power rating, such, for example, as vapor electric valves. These arrangements are known in the art as inverters. It has been customary to determine the frequency of the alternating current delivered by these inverters by means of a separate source of polyphase alternating current which is used to excite the grids of the several electric valves. It sometimes occurs that there is not available for grid excitation a source of alternating current of the desired frequency and number of phases. While my invention is particularly related to the generation of polyphase periodic currents, certain modifications are also suitable for the generation of single phase periodic current.

It is an object of my invention, therefore, to provide an electric power converting apparatus including electric valves which will be capable of converting direct current into periodic current of any desired frequency and number of phases and which will be self exciting, that is, will not be dependent upon an auxiliary source of alternating current for the excitation of the control grids of the several valves.

In addition, it has been found that, in the operation of such electric power converting apparatus utilizing electric valves at large power output, the frequency of the periodic current delivered by the apparatus varies substantially with the variations of load.

It is a further object of my invention to provide an electric power converting apparatus including electric valves which is capable of generating periodic current of any desired frequency and number of phases and which is particularly applicable for use as an auxiliary periodic current generator for the excitation of the control grids of the electric valves in the main electric power converting apparatus.

It is a further object of my invention to provide such electric power converting apparatus including electric valves in which the frequency of the periodic current delivered by the apparatus may be controlled over wide limits.

In accordance with my invention I provide a plurality of parallel circuits connected across a source of direct current, at least one circuit being provided for each phase of the polyphase periodic current to be generated. In each of these circuits is included an electric valve and an impedance, which may be a resistor or an inductive winding such as a reactor or a winding of a transformer. Commutating capacitors are connected between certain of the valve circuits to effect the transfer of current between the several valves. A negative bias potential is applied to the control grid of each of the several valves and the valves are rendered conducting in a predetermined sequence by overcoming this negative bias of the grids of the several valves in accordance with the conductivity of the next adjacent valve in the order in which the valves are rendered conducting. This means for overcoming the negative bias may be either an impedance connection between the grid of each of the valves and the next adjacent valve to be rendered conducting or a transformer connection between each of the grids and the anodes of certain other of the electric valves.

Figure 2:
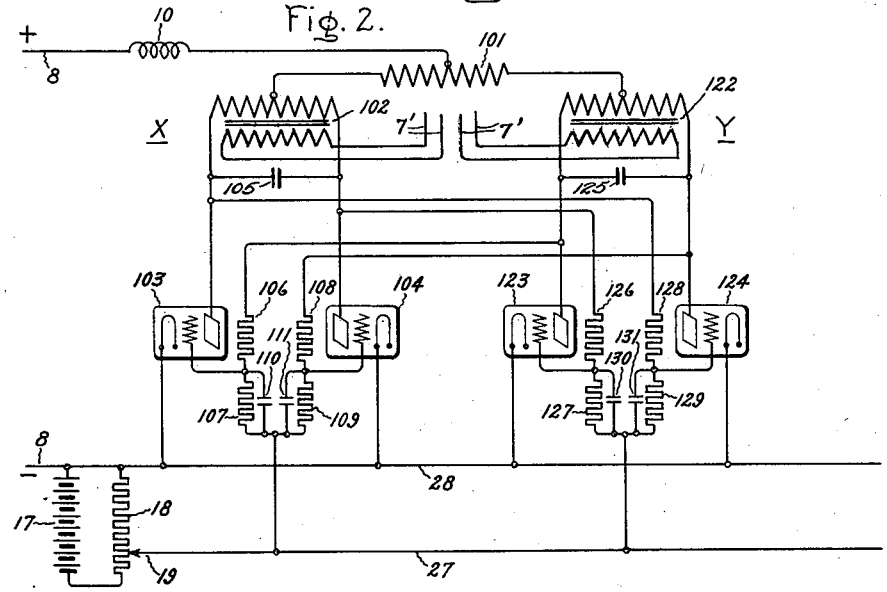
Figure 3:
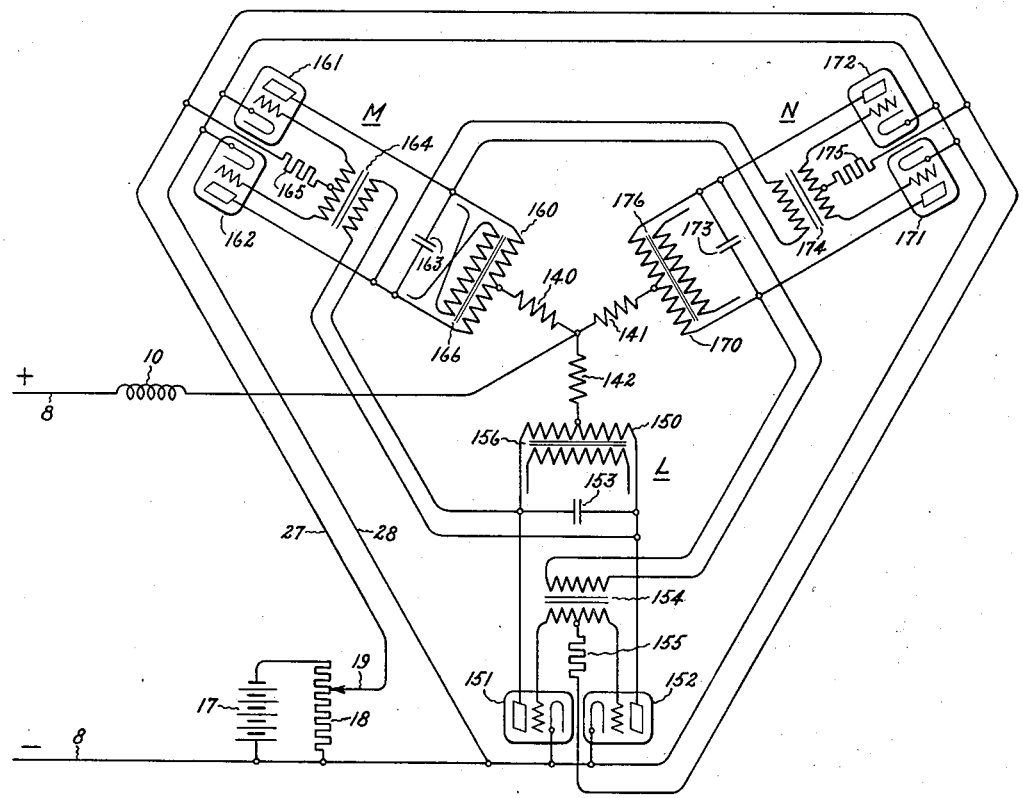

For a better understanding of my invention together with other and further objects thereof, reference is had to the following description taken in connection with the accompanying drawings, and its scope will be pointed out in the appended claims. Fig. 1 of the accompanying drawings is a diagrammatic representation of one embodiment of my invention for generating a six-phase periodic current in which the grid of each electric valve is coupled to the anode of the next adjacent electric valve through an impedance. Fig. 2 represents a modification of my invention for generating two-phase alternating current, while Fig. 3 shows a still further modification of my invention suitable for generating a three-phase alternating current.

Referring more particularly to Fig. 1 of the drawings, I have illustrated an apparatus for receiving direct current energy from the circuit 8, converting it into periodic current and delivering it to a six-phase load circuit 7. This apparatus includes the windings A–F, inclusive, which constitute the primary windings of output transformers, the secondary windings A'–F', inclusive, of which are connected to the load circuit. The windings A–F, inclusive, are included in a plurality of parallel circuits connected across the direct current circuit 8 through a variable resistor 9 and a reactor 10. These parallel circuits comprise electric valves 11–16 inclusive, resistors 21–26 inclusive and phase windings A–F respectively.

Electric valves 11–16 inclusive are each provided with an anode, a cathode, and a control grid, and may be of any of the several types well known in the art, but I prefer to use the valves of the vapor electric discharge type in which the starting of current through the valves is determined by the potential on the control grid, but in which current through the valves may be interrupted only by reducing the anode potential below its critical value. Under certain operating conditions either the resistors 21–26 or the transformer windings A–F may be omitted, in which latter case the resistors 21–26 constitute the load circuit. Capacitors 31–36 are connected between the anodes of adjacent valves, while capacitors 41–46 inclusive are connected between the common point of the phase windings A–F and the anodes of the valves 11–16 inclusive. In order that the several electric valves shall be rendered conducting in a predetermined sequence, the control grid of each valve is connected to the anode of the next succeeding valve in the direction of phase rotation through a voltage divider arrangement. For example, the control grid of electric valve 11 is connected through a current limiting resistor 51 to the intermediate point of a voltage divider comprising resistors 61 and 71, which is connected between the anode of the electric valve 12 and a grid bus 27. The grid bus 27 in turn is connected to the bus 28, which constitutes the common connection of the cathodes of the several electric valves, through a voltage divider comprising resistor 18 and a variable connection 19 energized directly across a negative bias battery 17. Condenser 91 is connected in parallel to resistor 71 for the purpose hereinafter set forth. The control grids of the electric valves 12–16 inclusive are similarly connected to the anodes of the next succeeding valves through resistors 52–56, 72–76, and 82–86, respectively, while condensers 92–96 are connected in parallel to the resistors 72–76 inclusive. For certain operating conditions, as explained more fully below, it may be desirable to connect the grid of each of the electric valves 11–16 to the anode of some valve other than the next succeeding valve. For example, the control grid of electric valve 11 may be connected through a resistor 81 to the anode of electric valve 14, while the control grids of electric valves 12–16 inclusive may be similarly connected through resistors 82–86 to the anodes of the diametrically opposite valves.

In explaining the operation of the above described apparatus, it will be noticed that when the direct current circuit 8 is deenergized, a negative bias potential is impressed upon the grids of the several valves 11–16 inclusive by means of the negative bias battery 17 and the voltage divider arrangement 18–19. This negative bias potential appears between the busses 27 and 28 and is impressed upon the grid of electric valve 11, for example, through resistors 51 and 71. When the direct current circuit 8 is energized, current will flow through the resistor 9, the reactor 10, phase winding B, resistor 22, resistor 61 and capacitor 91, the circuit being completed through the voltage divider arrangement 18–19 and the bus 28. It will be seen that the terminal potential of capacitor 91 due to its charge received from the above described circuit is opposite in polarity to the negative grid potential derived from the battery 17 so that, when the capacitor 91 becomes charged to a potential substantially equal and opposite to that derived from the battery 17, the grid of electric valve 11 will be at substantially the same potential as its cathode and the valve will become conducting. Similarly, after a certain time interval each of the other valves will be rendered conducting, but it will be assumed that electric valve 11 is first made conducting and that electric valve 12 is the next to be rendered conducting. When electric valve 11 becomes conducting its anode potential is reduced to substantially zero, the potential of the grid of electric valve 16, which is connected to the anode of valve 11 through resistors 56 and 66, is also correspondingly decreased, the capacitor 96 discharging through resistor 76 and the negative bias derived from the battery 17 prevailing to maintain the valve 16 nonconducting. At the same time one terminal of capacitor 31 is maintained at substantially zero potential while the other terminal is at substantially line potential with the result that this capacitor becomes charged to approximately line potential. When electric valve 12 becomes conducting it will be noticed that capacitor 31 is short-circuited directly through electric valves 11 and 12 with the result that the current in electric valve 11 is instantly interrupted as will be well understood by those skilled in the art. At the same time, the anode potential of electric valve 12 is reduced to substantially zero and with it the grid of electric valve 11 is correspondingly reduced in potential so that the negative bias of the battery 17 maintains electric valve 11 nonconducting. In a similar manner the current is successively transferred between the several valves 12 to 16 inclusive. As soon as the current is interrupted in electric valve 11 its anode potential will commence to rise, the rate at which the potential rises being dependent upon the value of resistor 9 and the size of capacitors 31 and 36 to which the anode is directly connected. As the potential of the anode of electric valve 11 rises the capacitor 96 is slowly charged through resistor 66 and, shortly after electric valve 15 becomes conducting the capacitor 96 becomes charged to such a potential as to overcome the negative bias derived from the battery 17 so that electric valve 16 is again made conducting. While the frequency at which the current is transferred between the several valves will, of course, depend upon the constants of the several circuit elements, it has been found that it may be most easily determined by properly fixing the size of capacitors 91–96 inclusive, but that it may also be varied over wide limits by adjusting the resistance of resistor 9. While an apparatus has been illustrated in which six-phase periodic current may be obtained from secondary windings A'–F' associated with the phase windings A–F inclusive, a periodic potential may also be obtained by connecting the load circuit directly across the windings A–F or resistors 21–26 inclusive. For certain purposes it may be found that either the phase windings A–F inclusive or the resistors 21–26 inclusive may be omitted. For instance, in the case considerable power output is desired, the resistors 21–26 may be preferably omitted, while in case the apparatus is to be used merely as a master oscillator to drive a larger power converter, it may be found desirable to omit the transformer windings A–F inclusive.

In the above explanation, the connections between the grids of the several electric valves and the anodes of the diametrically opposite valves and the capacitors 41–46 have been disregarded and it has been assumed that only a single valve was conducting at any given instant. With the grid of electric valve 11, for example, connected to the anode of electric valve 14 through resistor 81, it will be seen that the resistors 61 and 81 comprise in effect a voltage divider connected between the anodes of electric valves 12 and 14 with the result that the average of the potential of these two valves is impressed upon the grid of electric valve 11. Since the potential of the anode of electric valve 14 is intermediate that of the anode of electric valve 16 which has just been made nonconducting and that of electric valve 12 which is the next valve to be made conducting after electric valve 11, it will be seen that the grid potential of electric valve 11 will be reduced a smaller amount than when connected only to the anode of valve 12. With this connection assume, for example, that electric valve 12 next becomes conducting. As before, capacitor 31 will momentarily interrupt the current in electric valve 11, but, since this grid is still positive, the current will immediately restart in this valve so that the current will simultaneously flow in electric valves 11 and 12. Similarly, when valve 13 becomes conducting, current in valves 11 and 12 is momentarily interrupted but immediately restarts. When electric valve 14 becomes conducting, the current will momentarily be interrupted in electric valves 11, 12, and 13, but this time the grid potential of electric valve 11 will be so reduced as to hold the valve nonconducting so that current will not restart since the anodes of valves 12 and 14 are both at substantially zero potential. With these connections, current will simultaneously flow in three valves of the arrangement at all times. Obviously by connecting the grid of each of several valves to the anodes of the proper electric valves, the circuit may be made to operate with any number of the valves, less than all, conducting simultaneously.

When two or more valves conduct simultaneously, it has been found that, as each successive valve is made conducting and momentarily interrupts the current in the other valves that are conducting, the anode potentials of each of the other valves that remain nonconducting are also momentarily reduced due to the capacity coupling between these anodes through the several capacitors 31–36 inclusive. Since the capacity couplings between a given valve and each of the several other valves are unequal, the anode potentials of these other valves will be reduced by unequal amounts as each nonconducting valve is made conducting, and it has been found that the anode potential of the next valve to be made conducting is often reduced to such a value as to make the operation of the apparatus unsatisfactory. In order to overcome this difficulty, capacitors 41–46 inclusive, have been connected between the neutral point of the phase windings A–F inclusive, and the anodes of the several valves 11–16 respectively. These capacitors 41–46 inclusive tend to equalize the capacity connections between each anode and each of the several other anodes of the electric valves, and improve the operation of the apparatus. While I have described above a converting apparatus for generating six phase periodic current, it will be obvious to those skilled in the art that my invention is applicable to the generation of single phase or polyphase periodic current of any number of phases.

In Fig. 2 I have illustrated a modification of my invention for generating two phase alternating current. While this arrangement requires two electric valves for each phase, it is particularly suitable for delivering large amounts of power at a constant frequency where no polyphase grid excitation is available. This apparatus comprises, in effect, a pair of single phase parallel inverters connected across a direct current circuit 8 through an inductive winding 101 which may be, for example, an interphase transformer. The inverter X comprises a transformer 102 having a primary winding provided with an electrical midpoint connected to the direct current circuit 8 through the inductive winding 101, and with a pair of outer terminals connected to the negative direct current circuit 8 through a pair of electric valves 103 and 104. A capacitor 105 is also connected between the outer terminals of the inductive winding 102. The inverter Y comprises a similarly connected transformer 122, electric valves 123 and 124 and capacitor 125. The secondary windings of the transformers 102 and 122 are connected to the two-phase load circuit 7'. The electric valves 103, 104, 123, and 124 are preferably of the vapor electric discharge type. As in the arrangement described above, the grid of each electric valve is connected to the midpoint of a voltage divider which is energized across the anode and the cathode of the next successive valve in the order in which the valves are made conducting and, as before, the grid circuit of each electric valve includes a negative bias derived from a battery 17 and a voltage divider 18—19. For example, the grid of electric valve 103 is connected to the midpoint of the voltage divider comprising resistors 106 and 107 connected between the anode of electric valve 123 and the grid bus 27 which in turn is connected to the cathode bus 28 through the voltage divider 18—19. Similarly the grid of electric valve 104 is connected through the voltage divider comprising resistors 108 and 109 to the anode of electric valve 124. As in the above described apparatus, resistors 107 and 109 are connected in parallel with capacitors 110 and 111 respectively. The grids of electric valves 123 and 124 are similarly connected to the anodes of electric valves 103 and 104 through resistors 126–129 inclusive and capacitors 130 and 131 are connected in parallel to resistors 127 and 129 respectively.

The operation of the apparatus described in connection with Fig. 2 is very similar to that described in connection with Fig. 1, the electric valves becoming conducting in the order 103, 123, 104, and 124 respectively. As each valve becomes conducting and its anode potential falls to substantially zero, the grid of the next succeeding valve is made negative and thus renders that valve nonconducting until its associated grid capacitor becomes charged to a sufficient positive potential from the anode of the next succeeding valve to overcome the negative grid bias and again render it conducting.

In Fig. 3 I have illustrated an extension of the arrangement shown in Fig. 2 for converting direct current into three-phase alternating current. In this modification the grids of the several electric valves are connected to the anodes of the proper valves by means of grid transformers rather than the impedance couplings used in the arrangements illustrated in Figs. 1 and 2. This apparatus comprises three single phase parallel inverters L, M, and N, connected across the direct current circuit 8 through a reactor 10, and inductive windings 140, 141 and 142 which preferably comprise an interphase transformer. The inverter L comprises an inductive winding 150 provided with an electrical midpoint connected to the positive direct current line 8 through the inductive winding 142 and with a pair of outer terminals connected to the negative direct current line through electric valves 151 and 152 respectively. A capacitor 153 is connected between the outer terminals of the inductive winding 150 to commutate the current between the valves. The grid circuits of electric valves 151 and 152 include opposite halves of the secondary winding of a grid transformer 154, a current limiting resistor 155, and a negative bias derived from the voltage divider 18—19. The primary winding of the grid transformer 154 is connected between the anodes of the electric valves of the inverter N. Similarly the inverter M comprises an inductive winding 160, electric valves 161 and 162 and capacitor 163, while the grid circuits of electric valves 161 and 162 include opposite halves of the secondary winding of a grid transformer 164, a current limiting resistor 165 and a negative bias derived from the voltage divider 18—19. The primary winding of grid transformer 164 is connected between the anodes of electric valves 161 and 162 of inverter L. Similarly, inverter N comprises an inductive winding 170, electric valves 171 and 172 and a capacitor 173 while the grid circuits of electric valves 171 and 172 include opposite halves of the secondary winding of a grid transformer 174, a current limiting resistor 175, and a negative bias derived from voltage divider 18—19. As in the previous arrangements, the electric valves are preferably of the vapor electric discharge type. The inductive windings 150, 160, and 170 preferably constitute the primary windings of power transformers 156, 166, and 176, the secondary windings of which comprise the load circuit as in the arrangements of Figs. 1 and 2, as shown.

The operation of the above described apparatus is slightly different from that of the apparatus shown in Figs. 1 and 2 and may be explained as follows: Assume for example, that electric valves 151, 162, and 171 are initially conducting and that the anode of electric valve 172 first reaches its maximum positive potential. A proportional positive potential is impressed by means of the grid transformer 154 upon the grid of electric valve 152 to overcome the negative bias of voltage divider 18—19 and render this valve next conducting. Capacitor 153 will now transfer the current in inverter L from the electric valve 151 to valve 152, as will be well understood by those skilled in the art. As electric valve 151 is made nonconducting, capacitor 153 becomes gradually charged and the potential of the anode of electric valve 151 will gradually rise to substantially twice the potential of the direct current circuit 8. When the anode of electric valve 151 reaches approximately its maximum potential, a corresponding positive potential will be impressed by means of the grid transformer 164 upon the grid of electric valve 161 which will be sufficient to overcome the negative bias derived from voltage divider 18—19 and will render electric valve 161 conducting. Capacitor 163 will now transfer the current of inverter M from valve 162 to valve 161 and this transfer of current between the valves will, after a predetermined time interval, impress a positive potential upon the grid of electric valve 172 so that capacitor 173 will transfer the current from electric valve 171 to 172. This reversal of the current in inverters L, M, and N, will thus continue indefinitely in the same sequence. It will be noticed that in this arrangement the alternating current flowing in inductive windings 150, 160, and 170 are displaced by 60 electrical degrees, that is, the current in each inverter is not reversed until after the reversal of current in each of the other inverters. By reversing the connections of the secondary winding of the transformer 166, however, three-phase alternating current will be delivered to the load circuit.

While I have described what I at present consider preferred embodiments of my invention, it will be obvious to those skilled in the art that various changes and modifications may be made without departing from my invention, and I therefore, aim in the appended claims to cover all such changes and modifications as fall within the true spirit and scope of my invention.

What I claim as new and desire to secure by Letters Patent of the United States, is:

1. Apparatus for producing a polyphase periodic potential comprising a source of current, a plurality of parallel circuits connected across said source, each including an electric valve, commutating capacitors connected between certain of said valve circuits, and means for rendering said valves conductive in a predetermined sequence comprising means responsive to the conductivity of each valve for controlling the conductivity of the sequentially adjacent valve.

2. Apparatus for producing a polyphase periodic potential comprising a source of current, a plurality of parallel circuits connected across said source each including an electric valve, commutating capacitors connected between certain of said valve circuits, and means for rendering said valves conductive in a predetermined sequence comprising means responsive to the potential across each valve for controlling the conductivity of the sequentially adjacent valves.

3. Apparatus for producing a variable frequency polyphase periodic potential comprising a source of current, a plurality of parallel circuits connected across said source, each including an electric valve provided with a control grid and an impedance, commutating capacitors connected between certain of said valve circuits, and means for rendering said valve conductive in a predetermined sequence comprising a source of variable negative bias potential for the several control grids and means associated with each control grid responsive to the potential across the sequentially adjacent valve.

4. Apparatus for producing a polyphase periodic current comprising a source of current, a plurality of parallel circuits connected across said source, each including an impedance and an electric valve, commutating capacitors connected between certain of said valve circuits, and means for rendering said valves conductive in a predetermined sequence comprising means responsive to the flow of current in each valve for maintaining the next preceding valve non-conductive until certain other of said valves have been rendered conductive.

5. Apparatus for producing a polyphase periodic current comprising a source of current, a plurality of parallel circuits connected across said source each including an impedance and an electric valve, commutating capacitors connected between certain of said valve circuits, and means for rendering said valves conductive in a predetermined sequence comprising means for controlling the conductivity of each of said valves in accordance with the potential across the next succeeding valve to be made conductive.

6. Apparatus for producing a polyphase periodic current comprising a source of current, a plurality of parallel circuits connected across said source, each including an impedance and an electric valve provided with a control grid, commutating capacitors connected between certain of said valve circuits, and means for rendering said valves conductive in a predetermined sequence comprising a source of negative bias potential for the several control grids and means associated with each valve responsive to the potential across the next succeeding valve to be made conductive for overcoming the negative bias to render the valve conducting.

7. Apparatus for producing a polyphase periodic potential comprising a source of current, a plurality of parallel circuits connected across said source, each including an impedance and an electric valve provided with a control grid, commutating capacitors connected between certain of said valve circuits, and means for rendering said valves conductive in a predetermined sequence comprising a source of negative bias potential for the several control grids and a connection, including an impedance, from each of said grids to the anode of the next succeeding valve to be made conductive.

8. Apparatus for producing a polyphase periodic potential comprising a source of current, a plurality of parallel circuits connected across said source, each including an impedance and an electric valve provided with an anode, a cathode, and a control grid, commutating capacitors connected between certain of said valve circuits, and means for rendering said valves conductive in a predetermined sequence comprising a source of negative bias potential for the several control grids, a voltage divider connected between the anode and cathode of each valve, a connection from the grid of each valve to the voltage divider associated with the next succeeding valve to be made conductive, and a capacitor associated with the grid circuit of each valve to produce a time delay between the rise in potential of each grid and that of the anode to which it is connected.

9. Apparatus for producing a polyphase periodic potential comprising a source of current, a plurality of parallel circuits connected across said source, each including an impedance and an electric valve provided with a control grid, commutating capacitors connected between the several adjacent valve circuits, and means for consecutively rendering said valves conductive comprising a source of negative bias potential for the several control grids, and means associated with each valve responsive to the potential across the next succeeding valve for overcoming the negative bias to render the valve conductive.

10. Apparatus for producing a variable frequency polyphase periodic potential comprising a source of current, a plurality of parallel circuits connected across said source, each including an impedance and an electric valve provided with an anode, a cathode, and a control grid, commutating capacitors connected between the several adjacent valve circuits, and means for consecutively rendering said valves conductive comprising a source of variable negative bias potential for the several control grids, a voltage divider connected between the anode and cathode of each valve, and a connection from the grid of each valve to the voltage divider associated with the next succeeding valve.

11. Apparatus for producing a variable frequency polyphase periodic potential comprising a source of current, a plurality of parallel circuits connected across said source, each including an impedance and an electric valve provided with an anode, a cathode, and a control grid, commutating capacitors connected between the several adjacent valve circuits, capacitors connected between the common connection of said impedances and the anodes of said valves, and means for consecutively rendering a plurality of said valves conductive comprising a source of variable negative bias potential for the several control grids, a voltage divider connected between the anode and cathode of each valve, and a connection from the grid of each valve to the voltage divider associated with the next succeeding valve and another succeeding valve.

12. Apparatus for producing $n$-phase polyphase alternating current comprising a source of current, $n$ pairs of parallel circuits connected across said source, each of said circuits including an inductive winding and an electric valve, a commutating capacitor connected between the valve circuits of each of said pairs, and means for rendering said valves conductive in a predetermined sequence comprising means responsive to the conductivity of each valve for controlling the conductivity of the sequentially adjacent valve.

13. Apparatus for producing $n$-phase polyphase alternating current comprising a source of current, $n$ pairs of parallel circuits connected across said source, each of said circuits including an inductive winding and an electric valve, commutating capacitors connected between the valve circuits of each of said pairs, and means for rendering said valves conductive in a predetermined sequence comprising means for controlling the conductivity of each of said valves in accordance with the potential across the next succeeding valve to be made conductive.

14. Apparatus for producing $n$-phase polyphase alternating current comprising a source of current, $n$ pairs of parallel circuits connected across said source, each of said circuits including an inductive winding and an electric valve provided with a control grid, commutating capacitors connected between the valve circuits of each of said pairs, and means for rendering said valves conductive in a predetermined sequence comprising a source of negative bias potential for the several control grids, a voltage divider connected between the anode and cathode of each valve, a connection from the grid of each valve to the voltage divider associated with the next succeeding valve to be made conductive, and a capacitor associated with the grid circuit of each valve to produce a time delay between the rise in potential of each grid and that of the anode to which it is connected.

15. Apparatus for producing $n$-phase polyphase alternating current comprising $n$ single phase inverters, each single phase inverter including a pair of electric valves, an impedance in each of said valve circuits and a commutating capacitor connected between said valve circuits, and means for controlling the conductivity of the valves of each inverter from the next preceding inverter in the order of phase rotation of the polyphase alternating current.

16. Apparatus for producing $n$-phase polyphase alternating current comprising a source of current, $n$ pairs of parallel circuits connected across said source, each of said circuits including an inductive winding and an electric valve, a commutating capacitor connected between the valve circuits of each of said pairs, and means for rendering said valves conductive in a predetermined sequence comprising means for controlling the conductivity of each of said valves in accordance with the potentials across the next preceding pair of valve circuits in the direction of phase rotation of the polyphase alternating current.

17. Apparatus for producing n-phase polyphase alternating current comprising a source of current, n pairs of parallel circuits connected across said source, each of said circuits including an inductive winding and an electric valve provided with a control grid, a commutating capacitor connected between the valve circuits of each of said pairs, and means for rendering said valves conductive in a predetermined sequence comprising a grid transformer and grid circuits for each pair of electric valves, said grid circuits including a source of negative bias potential and opposite halves of the secondary winding of said transformer, the primary winding of said transformers being connected across the next preceding pair of valve circuits in the direction of phase rotation of the polyphase alternating current.

18. Apparatus for producing a periodic potential comprising a source of current, a plurality of parallel circuits connected across said source, each including an electric valve, commutating means connected between certain of said valve circuits, and means for rendering said valves conductive in a predetermined sequence comprising means responsive to the potential across each valve for controlling the conductivity of the sequentially adjacent valve.

19. Apparatus for producing a periodic potential comprising a source of current, a plurality of parallel circuits connected across said source, each including an electric valve provided with a control electrode, commutating means connected between certain of said valve circuits, and means for rendering said valves conductive in a predetermined sequence comprising a voltage divider connected between the anode and cathode of each valve, and a connection from the control electrode of each valve to the voltage divider of the sequentially adjacent valve.

20. Apparatus for producing a periodic potential comprising a source of current, a plurality of parallel circuits connected across said source, each including an electric valve provided with a control electrode, commutating means connected between certain of said valve circuits, and means for rendering said valves conductive in a predetermined sequence comprising an impedance circuit including a capacitor connected between the anode and cathode of each valve, and a connection from the control electrode of each valve to the impedance circuit associated with the sequentially adjacent valve.

21. Apparatus for producing a periodic potential comprising a source of current, a plurality of parallel circuits connected across said source, each including an electric valve provided with a control electrode, commutating means connected between certain of said valve circuits, and means for rendering said valves conductive in a predetermined sequence comprising a voltage divider including a capacitor connected between the anode and cathode of each valve, and a connection from the control electrode of each valve to the voltage divider of the sequentially adjacent valve.

BURNICE D. BEDFORD.